United States Patent

Albright et al.

[15] 3,652,881
[45] Mar. 28, 1972

[54] GENERATOR VENTILATION DOME AND COOLER CASING CONSTRUCTION

[72] Inventors: Donald R. Albright, Scotia; James B. Archibald, Schenectady; Sterling C. Barton, Scotia, all of N.Y.

[73] Assignee: General Electric Company

[22] Filed: Oct. 15, 1970

[21] Appl. No.: 81,036

[52] U.S. Cl. ............................................310/57, 310/64
[51] Int. Cl. .............................................H02k 9/08
[58] Field of Search ..................310/57, 52, 53, 55, 58, 59, 310/62, 64, 254, 258

[56] References Cited

UNITED STATES PATENTS

| | | | |
|---|---|---|---|
| 2,650,994 | 9/1953 | Bahn | 310/57 |
| 2,717,320 | 9/1955 | Shoulders | 310/57 |
| 3,348,081 | 10/1967 | Willyoung | 310/55 |
| 3,439,202 | 4/1969 | Wanke | 310/52 |

FOREIGN PATENTS OR APPLICATIONS

| | | | |
|---|---|---|---|
| 641,180 | 5/1962 | Canada | 310/57 |

Primary Examiner—J. D. Miller
Assistant Examiner—R. Skudy
Attorney—William C. Crutcher, Frank L. Neuhauser, Oscar B. Waddell and Joseph B. Forman

[57] ABSTRACT

In a gas cooled dynamoelectric machine, a heat exchange apparatus is mounted transversely above the stator core and is enclosed by a detachable dome which is also mounted transversely to the axis of the stator core. The stator core has a plurality of axially spaced circumferential section plates which define cooling sections in combination with a cylindrical wrapper. Hot and cold gas pipes of varying lengths provide equal gas distribution and recovery throughout the stator core while recirculation and cooling is accomplished through dome first and second annular chambers communicating with said pipes through holes in the wrapper plate.

2 Claims, 1 Drawing Figure

PATENTED MAR 28 1972 3,652,881
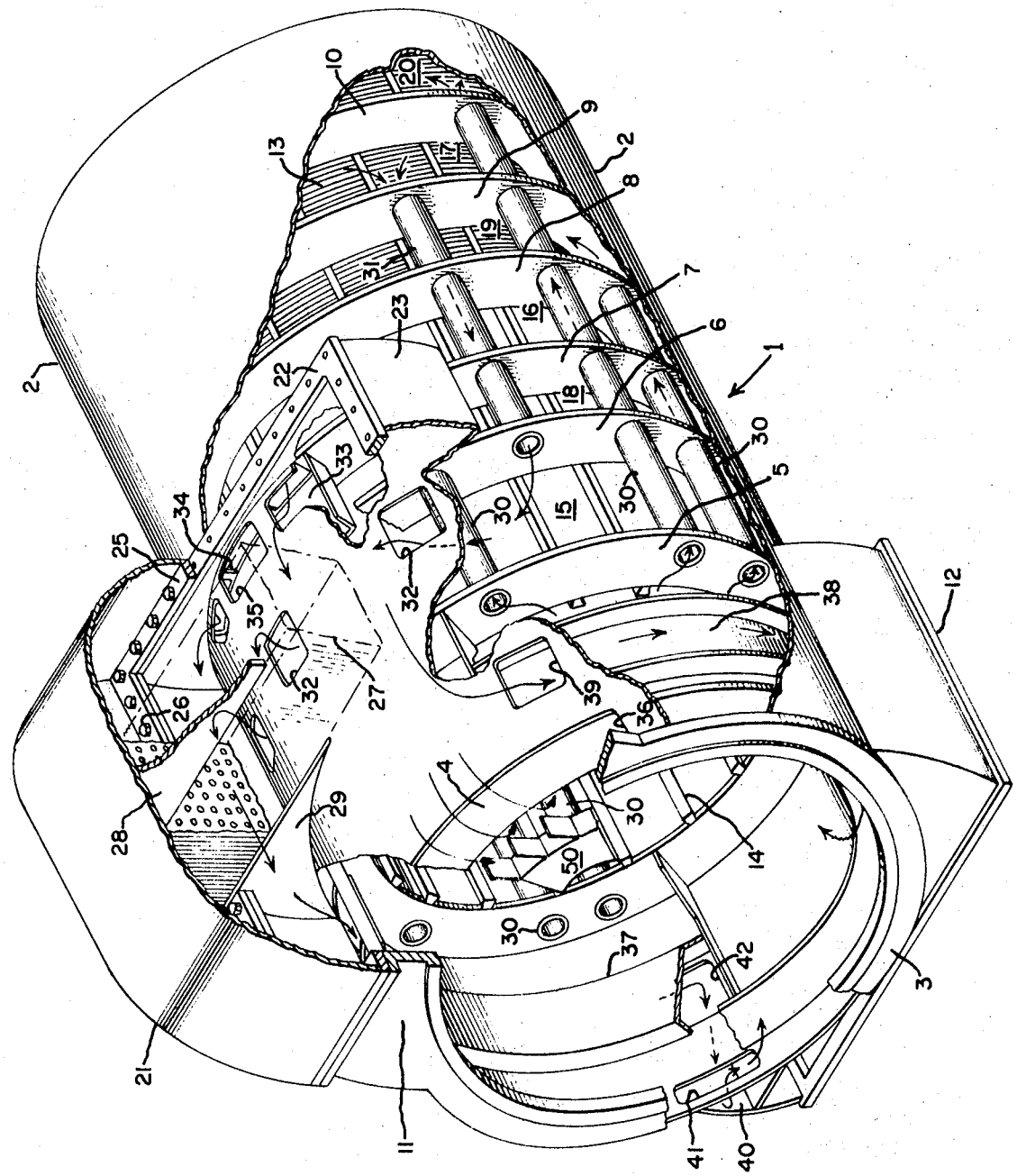
INVENTORS:
DONALD R. ALBRIGHT,
JAMES B. ARCHIBALD,
STERLING C. BARTON,
BY *W. C. Crutcher*
THEIR ATTORNEY.

GENERATOR VENTILATION DOME AND COOLER CASING CONSTRUCTION

BACKGROUND OF THE INVENTION

This invention relates generally to a dynamoelectric machine stator frame and more particularly to a gas cooled casing for a dynamoelectric machine having a high rating.

It is well known in the art that large dynamoelectric machines require some form of cooling. One of the more efficient methods of cooling is by a gas ventilating system contained within the dynamoelectric machine frame, together with liquid cooling of the stator conductor bars. In large generators the gas most normally utilized is hydrogen maintained at a pressure of from 30 p.s.i. to 90 p.s.i. Fans are usually provided for motivating the cooling gas throughout the gas ducting and over the hot machine parts.

As the cooling gas is heated while passing over various hot parts within the dynamoelectric machine, it becomes necessary to provide means to cool the gas so as to provide an efficient cooling and ventilating system. The prior art is exemplified in U.S. Pat. No. 2,650,994 issued Sept. 1, 1953 to J. J. Bahn which is assigned to the assignee of the present invention. In that patent a gas cooling system is provided and a plurality of gas coolers are positioned within a removable top cooling dome. The Bahn cooling dome extends axially the full length of the dynamoelectric machine frame, and the cooling path shown required the use of four gas coolers. With the large physical sizes and high ratings of today's dynamoelectric machines, it is always a desired goal to reduce the physical size while maintaining the same rating or, conversely, to increase the electrical ratings while maintaining the same physical size.

The single top cooling dome of the aforesaid Bahn patent was effective in its day in reducing transportation problems by permitting shipping of the cooler dome separately from the generator. However, the ventilation circuit of a generator with a fan at one end is such that it inherently requires more axial gas flow area near the fan end of the cooling circuit than it does at the other end of the cooling circuit away from the fan. The dome of the Bahn patent which ran the entire length of the generator was essentially wasteful of space toward the center of the generator.

An improved system would be one in which a dome construction was employed which more nearly approximated the actual gas flow requirements of the generator. The present invention contemplates smaller domes at each end of the generator, or only at one end of the generator in the case of a single fan unit.

By reducing the size of the dynamoelectric machine in this manner and providing the small top dome pieces which are removable for shipping, it can be appreciated that a lower cost is achieved, a simpler construction of each dome piece can be used, and easier erection is allowed at the final installation site when the overall dynamoelectric machine is assembled. Of course on shipping it will be apparent that by utilizing smaller domes, much less manufacturing and shipping space is required, and field assembly of the parts is facilitated.

Accordingly, in view of the foregoing, one object of the present invention is to improve the cooling flow path of the dynamoelectric machine and to reduce the overall size while maintaining the same electrical rating.

Another object is to provide small removable top domes, thereby facilitating shipping and ease of construction.

Yet another object is to lower the cost of the gas ventilating system by using fewer gas coolers.

Other objects, advantages and features of the present invention will become apparent from the following description of one embodiment thereof when taken in connection with the accompanying drawing in which the single FIGURE is a cutaway view in perspective showing the present invention at one end of the dynamoelectric machine.

SUMMARY OF THE INVENTION

Briefly stated, the present invention is practiced in one form by providing a removable top dome having a single heat exchanger element extending transversely to the wrapper plate centerline on the top and toward the end of the cylindrical wrapper plate. The removable top dome extends axially over at least three of the axially spaced circumferential section plates and together with the top dome, has additional chambers, baffles and conduit means for collecting the ventilating gas from between one pair of section plates, directing it so that it enters the top dome and flows generally axially through the heat exchanger element and thence into an annular chamber between a second pair of section plates.

DESCRIPTION OF THE PREFERRED EMBODIMENT

Referring now to the drawing, the details of the present invention will be described. Indicated generally at 1 is a perspective view of one-half of the overall dynamoelectric machine stator frame, the other end (not shown) being identical. The basic characteristics of stator frame 1 are similar to those of the prior art comprising a generally circular wrapper plate 2 commencing at end plate 3 and which is supported and sectioned by a plurality of additional axially spaced circumferential section plates indicated from the outboard end of stator frame 1 as 3, 4, 5, 6, 7, 8, 9 and 10 respectively. End plate 3 is the point at which a removable end piece (not shown) is fastened to stator frame 1. Positioned at the bottom of stator frame 1 and extending downwardly from the wrapper plate 2 is the upper part 12 of the terminal housing, the lower part of which is not shown.

It is to be noted that only one end of a symmetrical two-fan dynamoelectric machine frame is shown and that an identical oppositely opposed end will normally be present although not shown here. However, the present invention may also be practiced in a dynamoelectric machine stator frame which has a fan on only one end and a single-ended gas flow to and from the fan.

As will normally be the case, a laminated stator core will be constructed within the hollow portion of stator frame 1, generally indicated as 13. A plurality of axially extending circumferentially spaced key bars 14 will be positioned about the plurality of section plates in order to accommodate and support the laminated core. Also, as in the prior art, the stator core will be adapted to provide radially extending cooling passages throughout the stacked core. A typical construction is illustrated in U.S. Pat. No. 3,348,081 issued to D. M. Wilyoung and assigned to the present assignee, this patent being incorporated by reference herein.

The laminated stator core extends axially and begins generally at a location adjacent section plate 5. The radial cooling passages within the stacked core are formed such that a cooling gas outlet section is disposed between section plates 5 and 6, an inlet section between section plates 6 and 7, an outlet section between plates 7 and 8, an inlet section between plates 8 and 9, an outlet section between plates 9 and 10, and so forth alternately. The respective cooling gas inlet and outlet sections are generally in the form of annular chambers which are defined by the section plates, the laminated core and wrapper plate 2. The respective outlet sections beginning at section plate 5 and moving axially toward the center of frame 1 are designated respectively as 15, 16 and 17, while the respective inlet sections or annular chambers are designated as 18, 19 and 20. A general arrangement for such inlet and outlet sections may be seen by referring to the aforementioned Bahn patent or Willyoung patent.

Mounted atop the stator frame 1 is a removable top dome generally indicated as 21. The top dome 21 is, in the preferred embodiment, a removable dome piece which is curved as indicated to redirect the gas flow. After final assembly, it is mounted on and attached to a rectangular base 22 which is positioned about the top of side sections 23 and end section 11 so that it allows plane horizontal surface to be formed. At the bottom of the top dome 21 there is formed a rectangular bolting flange 25 forming a cooperating horizontal surface. After shipping and at final assembly, the top dome 21 is positioned on the dome base 22 and bolting means 26 are fastened in place. Since the overall dynamoelectric machine stator frame 1 is gastight, this joinder surface will also necessarily be gastight. A suitable welding preparation for field sealing is provided between the dome base and top dome.

The top dome 21 may take various shapes depending on the desired design configuration. For example, it is not necessary that the joinder surface between the base and top dome be on a horizontal plane. An alternate embodiment may provide that the top dome 21 take on a saddle shape such that it conforms generally to the outline of the cylindrical wrapper plate 2. In such an embodiment (not shown), the joinder line would be along a curvilinear and/or horizontal plane. In any such embodiment, it would of course still be necessary to provide suitable sealing means along the line of joinder.

The height dimension of the top dome 21, that is, the dimension from the joinder plane to the extreme top of the dome, is such as to allow the positioning of a removable transversely extending gas cooler indicated as 27 within the dome 21. Gas cooler 27 may be of any suitable type of heater exchanger but is preferably of the type utilizing finned tubes with water as the heat exchange medium. The gas cooler 27 is removable from the end of the top dome 21 by having it slidably positioned within the top dome transverse to the stator frame axis. In this manner, gas cooler 27 may be readily removed for cleaning or replacement as may be necessary during operation of the invention. By so positioning the gas cooler, it is readily apparent that the hot gases make but one pass through the heat exchanger elements.

A pair of upper and lower axially aligned baffles 28 and 29 respectively block the space above and below the gas cooler and act to channel the flow of hot gases through the gas cooler 27. The upper gas baffle 28 extends upwardly from the gas cooler 27 to the top of the removable top dome 21. The lower gas baffle 29 extends downwardly from the bottom of gas cooler 27 to the cylindrical wrapper plate 2.

Turning now to the details of the gas flow path as provided by the stator frame 1, there are provided axially extending gas pipes through selected section plates. A group of axial cold gas pipes indicated collectively as 30, originate at section plate 5 and extend axially to the selected inlet sections 18, 19 and 20. The various cold gas pipes 30, which collect cool ventilating gas from the fan outlet, may be spaced circumferentially in any suitable manner so as to evenly distribute the cool inlet gas to the plurality of inlet sections.

A group of axial hot gas pipes collectively indicated as 31, likewise extend axially throughout selected section plates. Each hot gas pipe originates at a selected section plate which defines one of the plurality of outlet sections. Some of the hot gas pipes 31 extend axially outboard toward section plate 6 where they open into the annular outlet chamber 15.

Although the hot and cold axial gas pipes 30 and 31 are shown here as located inside the wrapper plate 2 and passing through holes in the section plates, they may also be located outside the wrapper plate as external "blisters" and or pipes for transporting the gas in an axial direction. In either case they are disposed outside the stator core 13.

Positioned within that portion of the wrapper plate 2 which is entirely enclosed by the top dome side sections 23, end section 11 and top dome 21, are a plurality of circumferentially spaced openings 32 which open into the hot gas side of the gas cooler 27. It is apparent that the hot gas, after it is collected and directed to the outlet section 15, will flow through the openings 32 and then axially through the transversely mounted gas cooler 27. As shown on the drawing, a portion of the hot outlet gas from outlet section 16 takes a slightly different path in reaching the gas cooler 27. An enclosed chamber 33 is positioned within the inlet section 18 and has a plurality of openings therein for the gas flow. Openings 34 are positioned within the circumferential section plate 7 while a cooperating set of openings 35 are positioned in the wrapper plate 2. Of course as the hot outlet gas flows radially outward through the laminated core and exits into the outlet chamber 16, a portion of such gas will pass through openings 34 into the enclosed chamber 33 from where it will immediately exit through openings 34 and subsequently pass over the gas cooler 27.

After the ventilating gas has been cooled by flowing over the heat exchanger elements, it is ready to be directed back to the hot parts of the dynamoelectric machine. One advantage of utilizing a removable top dome with a semicylindrical shape is that as the flowing gas leaves the gas cooler 27, it will be directed downward by the shape of the top dome. Since it is desired to turn the flow of the cooled gas radially inward, this configuration of the top dome eliminates the need for a separate baffle, or the like. Positioned within the cylindrical wrapper plate 2, between section plate 4 and end plate 3 is a cutout portion 36 which extends circumferentially over a portion of the wrapper plate at the top of the unit. This cutout portion 36 provides the opening so that the gas may flow radially inward toward a fan 50. The fan is only partially shown for clarity but is attached to the dynamoelectric machine rotor and the single fan stage is positioned axially at the point of the section plate 4 and coaxial therewith. The cutout portion 36 is entirely within the top dome 21.

To facilitate uniform distribution of cooled gas to the fan, a pair of annular cool gas chambers are positioned on either side of the stator frame 1 and are indicated as 37 and 38 respectively. Cool gas chambers 37 and 38 are provided so that a portion of the cool gas may be directed circumferentially and generally downward to the bottom portion of the dynamoelectric stator frame 1. Openings 39 in wrapper 2 are provided to feed cool gas to chambers 37, 38. Chambers 37, 38 serve to distribute gas to the fan from the lower part of the stator frame. To accomplish this, near the bottom of the machine, a pair of axially extending chambers indicated as 40 are provided within the base member 12. Gas flows from openings 42 in the wrapper plate 2 into axial chambers 40. A plurality of openings 41 in the lower part of the wrapper 2 then allow the cool gas to exit from the chambers 40 and flow back radially inward between section plate 4 and end plate 3 from the bottom of the dynamoelectric machine, thereby helping to equalize the cool gas flow entering the fan.

OPERATION OF THE INVENTION

At the dynamoelectric machine manufacturing location, the section plates together with the wrapper plate, laminated core and other internal elements will be assembled. The removable top dome 21 and gas cooler 27 will not be attached to the stator frame. This stator frame will then be shipped separately from the top dome and at the installation site, the top dome together with the gas cooler will be securely fastened to the stator frame, thereby completing the overall dynamoelectric machine. It will be appreciated that by shipping the two elements separately, a larger machine may be provided without exceeding present shipping limits.

By providing an end-located removable top dome with removable transversely mounted coolers, it should be appreciated that a much lower cost will result at the point of installation as compared to the aforementioned Bahn patent. The construction offers improvements in the gas flow path and improved axial flow distribution of the cooling gas.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. An improved gas-cooled dynamoelectric machine stator frame of the type having a plurality of axially spaced circumferential section plates surrounded at their periphery by a generally cylindrical wrapper plate, with said section plates and said wrapper plate cooperating to form a portion of a radial flow ventilating system for a gas-cooled stator core with fan means at at least one end thereof, the improvement comprising:
- a removable top dome extending axially from a location adjacent one end of said wrapper plate and transversely mounted above said wrapper plate over at least three section plates, covering thereby a portion of the axial length of said wrapper plate,
- at least one gas cooler extending transversely to the wrapper plate centerline and mounted in said top dome,
- a first annular chamber defined by a pair of said section plates together with a first portion of said wrapper plate, said first wrapper plate portion having a plurality of first openings therein opening into said top dome,
- a plurality of hot gas pipes of varying length extending axially outside the stator core for collecting the hot ventilating gas from between selected section plates and directing it to said first annular chamber,
- a second annular chamber defined by another pair of section plates together with a second portion of said wrapper plate adjacent said first annular chamber, said second wrapper plate portion defining a plurality of second openings opening into the top dome,
- a plurality of cold gas pipes of varying length extending axially outside the stator core for collecting cool ventilating gas from said second annular chamber and distributing it between selected section plates, and
- baffle means arranged to direct gas from said first openings through said gas cooler into said second openings.

2. The combination according to claim 1 and further including:
- first conduit means directing gas flow directly from said top dome to said fan means at the top end of the stator frame, and
- second conduit means connecting said second annular chamber with said fan means at the bottom end of the stator frame.

* * * * *